US009765673B2

(12) United States Patent
Aiello et al.

(10) Patent No.: US 9,765,673 B2
(45) Date of Patent: Sep. 19, 2017

(54) SOOT MONITORING METHOD AND ALERT SYSTEM

(71) Applicant: Johnson Matthey Public Limited Company, London (GB)

(72) Inventors: Rita Aiello, King of Prussia, PA (US); Richard Mark Paczewski, West Chester, PA (US); Kevin Carre, Phoenixville, PA (US); Paul Joseph Andersen, Plymouth Meeting, PA (US)

(73) Assignee: Johnson Matthey PLC, London (GB)

( * ) Notice: Subject to any disclaimer, the term of this patent is extended or adjusted under 35 U.S.C. 154(b) by 1096 days.

(21) Appl. No.: 13/690,695

(22) Filed: Nov. 30, 2012

(65) Prior Publication Data
US 2014/0156207 A1 Jun. 5, 2014

(51) Int. Cl.
| G01M 15/04 | (2006.01) |
| G06F 19/00 | (2011.01) |
| F01N 9/00 | (2006.01) |
| F01N 3/021 | (2006.01) |

(52) U.S. Cl.
CPC ............. *F01N 9/002* (2013.01); *F01N 3/021* (2013.01); *F01N 9/007* (2013.01); *F01N 2550/04* (2013.01); *F01N 2900/1406* (2013.01); *F01N 2900/1602* (2013.01); *Y02T 10/20* (2013.01); *Y02T 10/47* (2013.01)

(58) Field of Classification Search
CPC ....................................................... G06F 19/00
See application file for complete search history.

(56) References Cited

U.S. PATENT DOCUMENTS

| 5,121,601 | A | * | 6/1992 | Kammel | 60/275 |
| 5,701,735 | A | * | 12/1997 | Kawaguchi | F01N 3/023 |
| | | | | | 422/169 |
| 7,104,050 | B2 | * | 9/2006 | Sato et al. | 60/295 |
| 7,251,932 | B2 | * | 8/2007 | Huang | 60/297 |
| 7,513,108 | B2 | * | 4/2009 | Tomlins et al. | 60/295 |
| 7,836,687 | B2 | * | 11/2010 | Stroia et al. | 60/295 |
| 7,877,988 | B2 | * | 2/2011 | Henderson et al. | 60/295 |
| 8,332,124 | B2 | * | 12/2012 | George et al. | 701/102 |
| 8,615,990 | B2 | * | 12/2013 | Wilhelm et al. | 60/295 |
| 9,011,569 | B2 | * | 4/2015 | Otsuki et al. | 55/523 |
| 9,027,333 | B2 | * | 5/2015 | Neely et al. | 60/311 |
| 9,068,494 | B2 | * | 6/2015 | Karlsson et al. | |

(Continued)

FOREIGN PATENT DOCUMENTS

EP 1762718 A2 * 3/2007 ........... F02D 41/024

*Primary Examiner* — John Breene
*Assistant Examiner* — Yaritza H Perez Bermudez

(57) ABSTRACT

A system and method of monitoring regeneration of a particulate matter filter for a stationary diesel engine is disclosed. The system monitors exhaust temperature and operating time of an engine to calculate accumulated operating time below a critical temperature. Upon reaching a maximum allowed accumulated operation time, the system initiates a warning signal to inform the operator to increase exhaust temperatures for passive regeneration of the filter. During regeneration, the system periodically measures filter pressure differential and the exhaust temperature to calculate a difference in pressure differentials measured at two different times and determine whether the difference is below a critical value to inform the operator that regeneration is complete.

20 Claims, 2 Drawing Sheets

(56) References Cited

U.S. PATENT DOCUMENTS

| | | | |
|---|---|---|---|
| 9,080,486 B2* | 7/2015 | Frank et al. | |
| 9,091,191 B2* | 7/2015 | Karlsson et al. | |
| 2005/0126161 A1* | 6/2005 | Otake | F01N 3/035 60/277 |
| 2008/0018442 A1* | 1/2008 | Knitt | 340/438 |
| 2008/0155963 A1* | 7/2008 | Iida | 60/273 |
| 2008/0196389 A1* | 8/2008 | Stroia | F01N 3/0231 60/274 |
| 2009/0288398 A1* | 11/2009 | Perfetto et al. | 60/287 |
| 2010/0313629 A1* | 12/2010 | Singh | F01N 3/023 73/23.31 |
| 2013/0000282 A1* | 1/2013 | Takayanagi | B01D 46/0086 60/295 |
| 2013/0133315 A1* | 5/2013 | Shibutani | F01N 9/002 60/311 |
| 2013/0153680 A1* | 6/2013 | Thangaswamy | F01N 3/0256 239/135 |
| 2015/0218999 A1* | 8/2015 | Chen et al. | |

* cited by examiner

SOOT MONITORING METHOD AND ALERT SYSTEM

FIELD OF THE INVENTION

The invention relates to methods and systems used to monitor and alert users of the need to regenerate a particulate filter associated with a diesel engine, particularly a stationary diesel engine.

BACKGROUND OF THE INVENTION

Internal combustion engines including diesel engines produce a number of combustion products including particulates, hydrocarbons ("HC"), carbon monoxide ("CO"), oxides of nitrogen ("NOx"), oxides of sulfur ("SOx") and others. Diesel particulate filters, such as catalyzed soot filters, close coupled catalysts, and others, can be used to trap particulates and reduce emissions from diesel exhaust.

In order to reduce the accumulation of particulate matter or soot on a filter, the filter is exposed to high temperatures by either increasing the engine load to increase temperature of the exhaust gas passing through the filter or by injecting fuel in the vicinity of the filter causing combustion. The combination of a catalyst and high temperature in the filter allows the accumulated soot to react with $NO_2$, converting it to carbon dioxide and thereby regenerating the filter. Active and passive regeneration of particulate filters associated with mobile diesel engines is easily achieved due to the high operating temperatures during normal operation and the sophisticated control systems typically incorporated in mobile systems, such as those found in automobiles. However, the same may not be true of stationary diesel engines.

Soot accumulation occurs at low load or low operating temperatures of a diesel engine, such as during cold starts. This is particularly a problem for stationary diesel engines which are used for back-up power generation. Back-up generators are used infrequently and typically are oversized for the facility for which they supply power, so that should the facility expand, a replacement generator will not be needed to meet any increase in power demand. Therefore, such stationary diesel engines operate at low load and do not generate the high exhaust temperatures during normal operation needed for filter regeneration. Many local ordinances require the regular inspection of back-up generators to determine whether they are working properly. The inspection involves turning on the generator for a short period of time periodically to ensure that the generator is operational. Therefore, the regular maintenance of stationary generators demanded by local legislation also contributes to soot accumulation.

SUMMARY OF THE INVENTION

If a filter is allowed to trap too much soot before regeneration, risks including excessive backpressure, uncontrolled combustion of the soot, and structural failure of the filter may result. Therefore, a need exists for a system to monitor and alert a user as to when filter regeneration is needed for a stationary diesel engine operating intermittently and at low temperatures.

In one embodiment of the invention, a method of monitoring regeneration of a particulate matter filter for a diesel engine is disclosed. The method comprises first determining soot accumulation by measuring exhaust temperature proximal to the particulate matter filter and operating time of an engine to calculate a first accumulated operating time during which the exhaust temperature is below a critical temperature and initiating a warning signal when the first accumulated operating time is greater than or equal to a first period. The warning signal prompts filter regeneration during which the following are repeatedly measured: The exhaust temperature proximal to the particulate matter filter, a first filter pressure differential at a first time, and a second filter pressure differential at a second time, wherein the second time is equal to the first time plus an interval in order to calculate an accumulated regeneration period. The accumulated regeneration period is the total number of instances during which the exhaust temperature is greater than or equal to a regeneration temperature and the difference between the first and second filter pressure differentials is less than or equal to a critical value. A completion signal is generated when the accumulated regeneration period is greater than or equal to a completion value. A completion signal may also be generated when the number of exhaust temperature measurements which meet or exceed the regeneration temperature is greater than or equal to a shutdown value.

As used herein throughout the specification and the claims, "proximal to the particulate filter" means a position at which the exhaust temperature is expected to be within 50%, more preferably 25%, even more preferably 10%, and most preferably 5% of the internal temperature of the particulate filter.

Also used herein throughout the specification and claims, "filter pressure differential" means the difference in pressure between a point upstream of the filter inlet and a point downstream of the filter outlet. Other components of the exhaust system of the diesel engine may be located within the two points, such as a diesel oxidation catalyst, so long as such other components do not adversely affect the accuracy of which the "filter pressure differential" represents the actual pressure drop across the filter.

As used herein throughout the specification and the claims, a "completion value" is a number selected to serve as a minimum limit in the algorithm of the present invention to predict the point at which filter regeneration is complete.

As used herein throughout the specification and the claims, a "shutdown value" is a number selected to serve as a maximum limit in the algorithm of the present invention to predict a point at which filter regeneration is complete and to prevent the unnecessary combustion of diesel fuel for purposes of filter regeneration.

In another embodiment of the invention, a system is disclosed for the regeneration of a particulate filter associated with a stationary diesel engine. The system comprises a programmable logic controller configured to predict when filter regeneration is required, a temperature sensor proximal to the particulate filter configured to monitor exhaust temperature of the engine, a pressure sensor configured to measure filter pressure differential, a clock, memory configured to store temperature readings from the temperature sensor, pressure readings from the pressure sensor, and time from the clock, an indicator configured to display a warning signal, and a user interface configured to allow a user to initiate at least one of soot accumulation monitoring and regeneration monitoring. The temperature sensor is preferably positioned upstream of the particulate filter.

In yet another embodiment of the present invention, a method is disclosed of monitoring and regenerating a particulate matter filter for a diesel engine. The method comprises monitoring exhaust temperature and operating time of an engine to calculate a first accumulated operating time below a critical temperature and initiating a warning signal when the first accumulated operating time is greater than or equal to a first period. The signal prompts an increase in engine load to increase the exhaust temperature. The increased load on the engine is maintained during a regeneration period. During the regeneration period, exhaust temperature is repeatedly measured, as well as a first filter pressure differential at a first time, and a second filter pressure differential at a second time, wherein the second time is equal to the first time plus an interval. From this data, an accumulated regeneration period is calculated, wherein the accumulated regeneration period is the total number of instances when the exhaust temperature is greater than or equal to a regeneration temperature and the difference between the first and second filter pressure differentials is less than or equal to a critical value. A completion signal is generated when either the accumulated regeneration period is greater than or equal to a completion value, or the number of exhaust temperature measurements which meet or exceed the regeneration temperature is greater than or equal to a shutdown value.

BRIEF DESCRIPTION OF THE FIGURES

In order that the invention may be more fully understood, the following figures are provided by way of illustration, in which.

DETAILED DESCRIPTION

Figure 1:
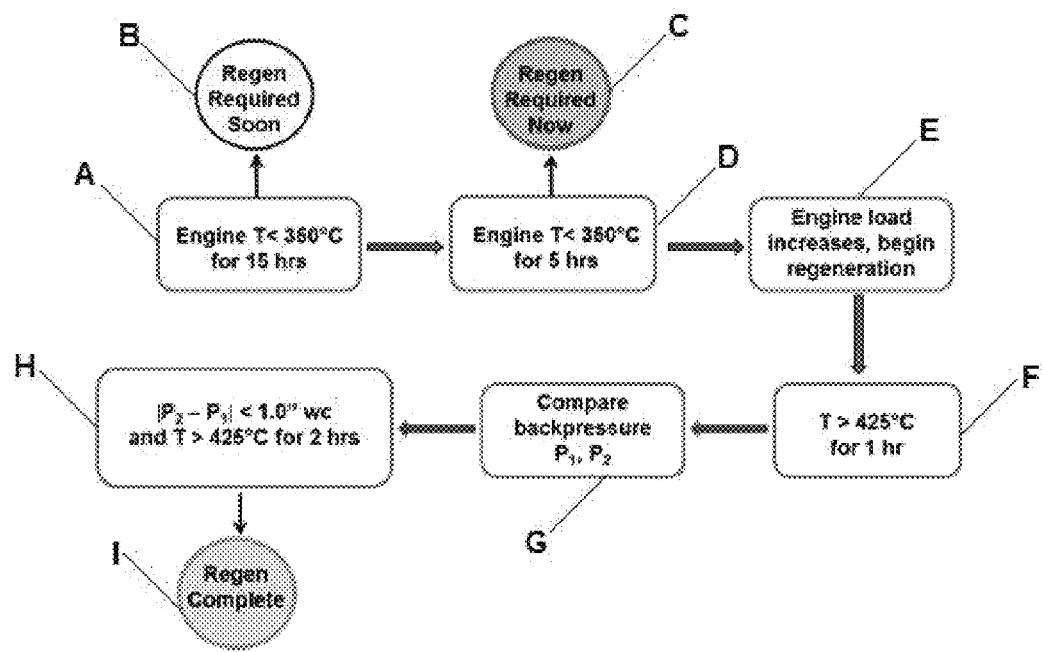
FIG. 1 is a flow diagram of a diesel particulate regeneration control strategy according to an embodiment of the present invention.

Because excessive soot accumulation can inhibit the performance of a diesel particulate filter system, the method of monitoring and regenerating a filter according to the present invention disclosed herein is provided to promote proper maintenance of a diesel particulate filter. It is difficult to predict how much soot has accumulated for a stationary diesel engine because pressure measurements do not correlate well with soot loading at the low exhaust flow rates characteristic of low-load operation. However, the present invention is able to overcome this obstacle. Use of the soot monitor and alert system made according to the present invention can facilitate maintenance of the diesel particulate filter, preventing excessive soot accumulation. Another advantage of the present invention is the ability to predict when filter regeneration is complete, so that fuel is not wasted on regenerating the diesel particulate filter for longer than is necessary. Thus, the present invention is particularly useful for diesel particulate filters installed specifically on diesel engines that do not have active regeneration and that may be run at conditions under which passive regeneration does not occur. It indicates when regeneration of the filter is needed and, once regeneration is initiated, when it is complete.

A soot monitor and alert system according to the present invention measures exhaust temperature, pressure, and time as long as the diesel engine is running. The total time that the diesel engine is running below a critical temperature is determined. The critical temperature, $T_C$, is preferably set as a temperature that is less than or equal to the regeneration temperature of the filter. The total time of operation below the critical temperature is calculated and stored as an accumulated operating time, $t_{A1}$. When $t_{A1}$ is greater than or equal to a first period, $t_1$, the system will initiate a warning signal. The warning signal may notify an operator that regeneration will be required immediately or soon. In addition, the monitoring system itself may be associated with a control system that will automatically initiate regeneration by increasing engine load at the appropriate time. The first period, $t_1$, may be calculated from the rate of particulate matter generated by the diesel engine that is likely to occur based on the size and typical operation conditions for the engine and the maximum allowable soot accumulation for the filter. Such values are known and easily calculated using methods familiar to those having skill in the art.

In another embodiment the soot monitor and system may include a second warning. Upon determining the total time of operation below $T_C$, the total time since $t_{A1}$ is stored as a second accumulated operating time, $t_{A2}$. Once $t_{A2}$ is greater than or equal to a second period, $t_2$, a second warning may be generated. In this embodiment, when the first accumulated operating time is equal to the first period a warning signal is initiated to provide notice that filter regeneration is required soon. When the second accumulated operating time is equal to the second period, the second warning signal is triggered to provide notice that regeneration is required immediately. The sum of $t_1$ and $t_2$ may be less than or equal to the maximum allowable mass of soot that may accumulate on the filter divided by the rate of soot production that is likely to occur based on the size and operating conditions of the diesel engine. Preferably, the sum of $t_1$ and $t_2$ is within 50% of this value, more preferably, within 25% of this value. Having a first and second warning signal is particularly advantageous if an operator is needed to increase engine load. The first signal warns an operator that a regeneration of a filter will be required soon and a second signal warns an operator that regeneration is required immediately. Upon receiving the first warning signal, the operator will be allowed to prepare for filter regeneration in advance of the time when regeneration is absolutely necessary. This is advantageous for a stationary diesel engine used as a back-up generator because the operator will be able to schedule regeneration and maintenance at a time that will not interfere with the operation of the facility for which the engine provides back-up power. Therefore, it is preferred that $t_2$ is less than $t_1$ and that $t_2$ is selected such that the operator will have sufficient advance warning.

According to an embodiment of the present invention, upon receiving the warning signal that regeneration is required immediately, the operator will increase engine load such that the exhaust reaches a regeneration temperature, $T_R$, allowing passive regeneration of the filter. Once $T_R$ is maintained for a lag period, $t_3$, pressure, P, is repeatedly measured across the filter, i.e. the filter pressure differential. This is done at the beginning and end of successive time intervals to calculate the difference over time. Thus, the difference in pressure differential may be determined according to the formula $\Delta P=P(t+i)-P(t)$, wherein $P(t)$ is pressure differential taken at a first time (t) and $P(t+i)$ is pressure differential taken at a second time (t+i), wherein "i" is an interval. The first calculation of $\Delta P$ would be at $t_3$. The next measurement would be at $t_3$ plus some period, p, and the next measurement would be at $t_3+2p$, and so on. The resulting values of $\Delta P$ after each period are compared to a critical pressure difference value, $P_C$. The algorithm according to the present invention determines the total time that exhaust temperature is greater than or equal to $T_R$ when $\Delta P$ is less than or equal to $P_C$ to predict when the filter has been sufficiently regenerated. In one embodiment of the invention, a total accumulated regeneration period is determined by summing the number of instances when both $\Delta P \leq P_C$ and the exhaust temperature at the time of recording the pressure differentials is greater than $T_R$. Any instance when either $\Delta P \leq P_C$ or the exhaust temperature during the recording of a pressure differential falls below $T_R$, then that instance is not counted toward the total accumulated regeneration period. When the accumulated regeneration period is greater than or equal to a completion value, a completion signal is generated.

By way of example, the following is one embodiment of a preferred method of monitoring a particulate filter according to the present invention with reference to FIG. 1. A first period, $t_1$, is set as 15 hours, and the critical temperature, $T_C$, is set to 350° C. Therefore, when the diesel engine runs for a first accumulated operating time of 15 hours below 350° C. as illustrated at block A, a first warning signal B is initiated to warn the operator that filter regeneration is required soon. The second period $t_2$ is set to 5 hours; therefore, when the second accumulated operating time reaches 5 hours, block D, a second warning signal C is triggered to warn the operator that filter regeneration is required immediately.

In the same embodiment of the invention, upon receiving the second warning signal C, the operator manually increases the engine load, increasing the temperature of the exhaust to a regeneration temperature, $T_R$, of 425° C. After increasing the engine load, the operator can then switch the monitor from monitoring soot accumulation to a new mode in which regeneration is monitored. During the regeneration monitoring mode, the system immediately begins to measure and record exhaust temperature and pressure readings for one hour, block F. Therefore, in this example there is no lag period. After one hour, the system begins to compare filter pressure differentials taken one hour apart, block G. In this example, the time interval between comparative pressure readings is set to one hour. The comparison may be performed every minute; however, the time interval and frequency of measurements may be more or less than those selected in this example. In this example, the pressure differential at 1 hour and the exhaust temperature at that time may be measured and stored for later comparison with the initial temperature and pressure reading. If the critical value for the difference in pressure differential, $P_C$, is set to 1.0" wc, the system determines at one hour whether $\Delta P \leq 1.0$" wc and whether the exhaust temperature was greater than or equal to 425° C. at the time each pressure differential was taken, block H. This is repeated again, for example, one minute later, i.e. filter pressure differential and exhaust temperature at one hour and 1 minute is recorded and compared with the filter pressure differential and exhaust temperature that was taken at one minute after the initial reading. Using this information, the system determines whether both $\Delta P \leq 1.0$" wc and exhaust temperature $\geq 425°$ C. are satisfied for that instance. If so, then that instance is added to the "accumulated regeneration period." It should be noted that the filter is likely being regenerated during times when the exhaust temperature is greater than $T_R$ and the pressure difference, $\Delta P$, is greater than the critical value, $P_C$. Such times, however, are not counted towards the "accumulated regeneration period," as used herein. The system will generate a completion signal I when the total number of instances when both $\Delta P \leq 1.0$" wc and the exhaust temperature $\geq 425°$ C. is equal to a completion value, $C_V$. In the example illustrated in FIG. 1, the completion signal I is triggered when $\Delta P \leq 1.0$" wc and exhaust temperature $\geq 425°$ C. for two hours; therefore, $C_V = 120$ if the frequency of filter pressure differential and temperature readings is every minute. The completion value is selected based upon factors such as the desired regeneration time for the filter, the frequency of filter pressure differential and exhaust temperature measurements, and whether a lag period is employed.

To prevent excessive regeneration that may occur, for example, as a result of a faulty temperature or pressure sensor, the system according to the present invention preferably includes a safety feature. In addition to a completion value, the method of operating the system according to the present invention may include a shutdown value. A completion signal is generated when the total number of exhaust temperature readings which exceed the regeneration temperature is greater than or equal to the shutdown value. Similar to the completion value, the shutdown value is selected based upon factors such as the desired regeneration time for the filter, the frequency of filter pressure differential and exhaust temperature measurements, and whether a lag period is employed.

Figure 2:
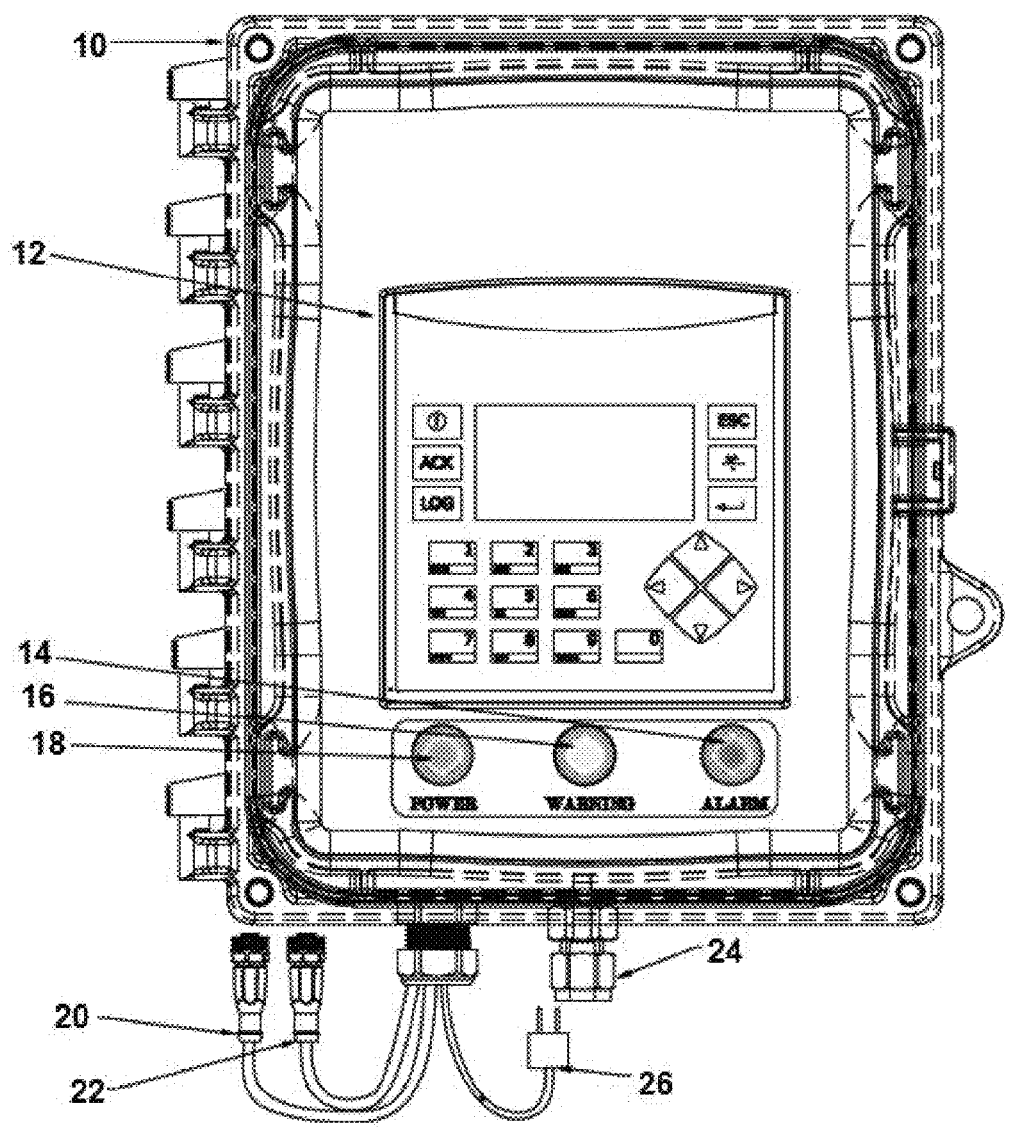
FIG. 2 is front view of a soot monitor that may be incorporated in another embodiment of the present invention.

Referring now to FIG. 2, a system for monitoring filter accumulation and regeneration according to one embodiment of the present invention is illustrated. The system housing 10 includes a user interface 12, three indicators 14, 16, 18, an alarm connector 20, a power cable 22, a pressure sensor connector 24, and a temperature sensor connector 26. Also included in the system, but not illustrated, is a programmable logic controller (PLC), memory for data storage, and a clock within the system housing 10, a temperature sensor and a pressure sensor installed in the exhaust system of the diesel engine and connected to the PLC, and an alarm connected to the PLC by the alarm connector 20.

The user interface 12 preferably includes a display and is configured to allow an operator to enter settings such as the current time and high temperature and pressure set points. The ability to change the temperature and pressure set points allows the monitor to be used for a range of different engine sizes and filters. The system preferably includes the feature of displaying and/or sounding an alarm when excessively high temperatures and pressures which exceed the set points are detected. The user interface 12 is also preferably configured to allow the operator to change the mode of operation of the system between soot accumulation monitoring and regeneration monitoring or to reset the system should the filter be cleaned or replaced.

During soot accumulation monitoring, the PLC will record the accumulated operating time of the engine and the exhaust temperature at those times to determine the total time below a critical temperature. When the first accumulated operating time is equal to a first period, the PLC will initiate a first warning signal and the warning indicator 16 will turn on to warn the operator. After a second accumulated operating time below a critical temperature which equals a second period is achieved, the PLC will trigger a second warning signal and the warning indicator 14 will inform the operator that regeneration must be performed immediately. The PLC may also sound an alarm at that time as well.

Upon increasing the engine load, the display on the user interface 12 will display the exhaust temperature which allows the operator to determine whether the amount of engine load is adequate for passive regeneration. Once the exhaust temperature has achieved the appropriate level, the operator can initiate regeneration monitoring by switching modes on the user interface 12. The PLC preferably performs the method previously described. Pressure differential and exhaust temperature are read by the pressure and temperature sensor. The values are stored in the system memory, such that the PLC can calculate the successive pressure differentials at a particular time interval. When the difference in pressure differential and temperature satisfies preselected critical values for a predetermined amount of time, the user interface 12 will display a message alerting the user that regeneration is complete. The operator can then reset the system and switch the mode back to monitoring soot accumulation. At that time, the PLC can turn off the indicators 14 and 16.

In an alternative embodiment of the system made according to the present invention, the initiation of the soot accumulation monitoring mode, increase in engine load, and filter regeneration monitoring mode may be accomplished by an operator or automated and dictated by the programmable logic controller.

The system may preferably include memory that is configured to include sufficient data storage space such that the operator may retrieve historical data concerning regeneration. For example, the operator may be able to retrieve data concerning the frequency and length of regeneration over a period of several months or years. The system may also optionally include the ability to be remotely controlled through a hardwire connection, such as an Ethernet connection, or wirelessly.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A method of monitoring regeneration of a particulate matter filter for a diesel engine, the method comprising:
   (a) measuring exhaust temperature proximal to the particulate matter filter and operating time of an engine to calculate a first accumulated operating time during which the exhaust temperature is below a critical temperature;
   (b) initiating a warning signal when the first accumulated operating time is greater than or equal to a first period, wherein the warning signal prompts filter regeneration by initiating an increase in engine load to increase exhaust, temperature;
   (c) repeatedly measuring the exhaust temperature proximal to the particulate matter filter, a first filter pressure differential at a first time, and a second filter pressure differential at a second time, wherein the second time is equal to the first time plus an interval,
   (d) calculating an accumulated regeneration period, wherein the accumulated regeneration period is total instances when the exhaust temperature is greater than or equal to a regeneration temperature and the difference between the first and second filter pressure differentials is less than or equal to a critical value; and
   (e) generating a completion signal when either
      i. the accumulated regeneration period is greater than or equal to a completion value, or
      ii. the number of exhaust temperature measurements measured during step (c) which meet or exceed the regeneration temperature is greater than or equal to a shutdown value.

2. The method of claim 1, wherein the first period is equal to ten hours.

3. The method of claim 1, further comprising:
   calculating a second accumulated operating time during which the exhaust temperature is below the critical temperature; and
   triggering a second warning signal when the second accumulated operating time is greater than or equal to a second period.

4. The method of claim 3, wherein the second period is two hours.

5. The method of claim 1, wherein step (b) prompts an increase in engine load.

6. The method of claim 5, wherein the engine load is increased automatically to increase the exhaust temperature above the regeneration temperature.

7. The method of claim 1, wherein step (c) begins after a lag period during which the exhaust temperature is greater than or equal to the regeneration temperature.

8. The method of claim 7, wherein the lag period is one hour.

9. The method of claim 1, wherein step (c) is repeated every minute.

10. A monitoring system for the regeneration of a particulate filter associated with a diesel engine, the system comprising:
   a temperature sensor proximal to the particulate filter configured to monitor the exhaust temperature;
   a pressure sensor configured to measure first and second filter pressure differentials;
   a clock;
   a memory configured to store temperature readings from the temperature sensor, pressure readings from the pressure sensor, and time from the clock;
   a programmable logic controller configured to perform a method of monitoring soot accumulation and regeneration of a particulate matter filter for an engine, the method comprising:
      (a) measuring exhaust temperature proximal to the particulate filter and operating time of the engine to calculate a first accumulated operating time during which the exhaust temperature is below a critical temperature,
      (b) initiating a warning signal when the first accumulated operating time is greater than or equal to a first period, wherein the warning signal prompts filter regeneration by initiating an increase in engine load to increase exhaust temperature,
      (c) repeatedly measuring the exhaust temperature proximal to the particulate filter, the first filter pressure differential at a first time, and the second filter pressure differential at a second time, wherein the second time is equal to the first time plus an interval,
      (d) calculating an accumulated regeneration period, wherein the accumulated regeneration period is total instances when the exhaust temperature is greater than or equal to a regeneration temperature and the difference between the first and second filter pressure differentials is less than or equal to a critical value, and
      (e) generating a completion signal when the accumulated regeneration period is greater than or equal to a completion value;
   an indicator configured to display the warning signal; and
   a user interface configured to allow a user to initiate at least one of steps (a) and (c) of the method performed by the programmable logic controller.

11. The monitoring system of claim 10, wherein the programmable logic controller is configured to generate the completion signal when the accumulated regeneration period is less than a completion value and the number of exhaust temperature measurements measured during step (c) which meet or exceed the regeneration temperature is greater than or equal to a shutdown value.

12. The monitoring system of claim 10 further comprising an alarm configured to sound when the exhaust temperature exceeds a maximum temperature setting.

13. The monitoring system of claim 10 further comprising an alarm configured to sound when filter pressure differential at any time exceeds a maximum pressure setting.

14. The monitoring system of claim 10 configured to be remotely controlled.

15. The monitoring system of claim 10, wherein the method which the programmable logic controller is configured to perform further comprises
calculating a second accumulated operating time during which the exhaust temperature is below the critical temperature; and
triggering a second warning signal when the second accumulated operating time is greater than or equal to a second period.

16. The monitoring system of claim 10, wherein step (b) of the method which the programmable logic controller is configured to perform prompts an increase in engine load.

17. The monitoring system of claim 16, wherein the programmable logic controller is configured to increase engine load automatically.

18. The monitoring system of claim 10, wherein step (c) of the method which the programmable logic controller is configured to perform begins after a lag period during which the exhaust temperature is greater than or equal to the regeneration temperature.

19. A method of monitoring and regenerating a particulate matter filter for a diesel engine, the method comprising:
(a) monitoring exhaust, temperature and operating time of an engine to calculate a first accumulated operating time during which the exhaust temperature is below7 a critical temperature;
(b) initiating a warning signal when the first accumulated operating time is greater than or equal to a first period, wherein the warning signal prompts filter regeneration by initiating an increase in engine load to increase exhaust temperature;
(c) maintaining the increased load on the engine during a regeneration period;
(d) repeatedly measuring the exhaust temperature, a first filter pressure differential at a first time, and a second filter pressure differential at a second time, wherein the second time is equal to the first time plus an interval;
(e) calculating an accumulated regeneration period, wherein the accumulated regeneration period is total instances when the exhaust temperature is greater than or equal to a regeneration temperature and the difference between the first and second filter pressure differentials is less than or equal to a critical value, and
(f) generating a completion signal when either
  i. the accumulated regeneration period is greater than or equal to a completion value, or
  ii. the number of exhaust temperature measurements measured during step (d) which meet or exceed the regeneration temperature is greater than or equal to a shutdown value.

20. The method of claim 19, further comprising calculating a second accumulated operating time during which the exhaust temperature is below the critical temperature; and triggering a second warning signal when the second accumulated operating time is greater than or equal to a second period.

* * * * *